(12) United States Patent
Ikeno

(10) Patent No.: US 11,726,104 B2
(45) Date of Patent: Aug. 15, 2023

(54) FLOW VELOCITY SENSOR WITH IMPROVED WEATHERABILITY

(71) Applicant: Tomokazu Ikeno, Iida (JP)

(72) Inventor: Tomokazu Ikeno, Iida (JP)

(\*) Notice: Subject to any disclaimer, the term of this patent is extended or adjusted under 35 U.S.C. 154(b) by 126 days.

(21) Appl. No.: 17/500,566

(22) Filed: Oct. 13, 2021

(65) Prior Publication Data

US 2022/0043020 A1 Feb. 10, 2022

Related U.S. Application Data

(63) Continuation of application No. PCT/JP2020/016245, filed on Apr. 13, 2020.

(30) Foreign Application Priority Data

Apr. 16, 2019 (JP) ................................. 2019-078202

(51) Int. Cl.
| | |
|---|---|
| *G01F 1/69* | (2006.01) |
| *G01F 23/02* | (2006.01) |
| *G01P 5/12* | (2006.01) |
| *G01F 23/24* | (2006.01) |
| *G01F 1/692* | (2006.01) |

(52) U.S. Cl.
CPC ............ *G01P 5/12* (2013.01); *G01F 1/69* (2013.01); *G01F 23/246* (2013.01); *G01F 1/692* (2013.01)

(58) Field of Classification Search
CPC . G01F 1/696; G01F 1/698; G01F 1/69; G01F 15/022; G01F 1/692; G01F 1/684; G01F 1/6847; G01F 15/068; G01F 1/6986; G01F 1/6842; G01F 1/6845; G01P 5/12; G01P 1/026

USPC .................... 73/861–861.94, 202–204.26
See application file for complete search history.

(56) References Cited

U.S. PATENT DOCUMENTS

| | | | | |
|---|---|---|---|---|
| 4,680,963 A | * | 7/1987 | Tabata ...................... | G01P 5/12 |
| | | | | 73/204.18 |
| 5,417,110 A | * | 5/1995 | Wood ..................... | G01F 1/6986 |
| | | | | 73/204.15 |
| 6,030,709 A | | 2/2000 | Jensen et al. | |
| 6,644,113 B2 | * | 11/2003 | Kawai .................. | G01F 1/6845 |
| | | | | 73/204.26 |
| 7,565,836 B2 | * | 7/2009 | Sukegawa ............... | G01F 1/699 |
| | | | | 73/204.15 |
| 2019/0170556 A1 | * | 6/2019 | Ikeno ..................... | G01F 1/696 |

(Continued)

FOREIGN PATENT DOCUMENTS

| | | |
|---|---|---|
| DE | 19614459 A1 | 10/1997 |
| EP | 801150 A2 | 10/1997 |

(Continued)

*Primary Examiner* — Andre J Allen
(74) *Attorney, Agent, or Firm* — Harness, Dickey & Pierce, P.L.C.

(57) ABSTRACT

A flow velocity sensor includes a substrate, a resistor, and a signal processing section. The substrate has first and second substrate surfaces outwardly opposite to each other. The first substrate surface is exposed to a fluid. The resistor is mounted on the second substrate surface. The resistor has a heat generating portion facing the second substrate surface. The signal processing section is configured to receive a signal from the resister. The signal from the resistor represents heat dissipation of the resistor. A fluid velocity is detected based on the signal from the resistor.

20 Claims, 8 Drawing Sheets

(56) References Cited

U.S. PATENT DOCUMENTS

| | | | | |
|---|---|---|---|---|
| 2022/0011145 A1* | 1/2022 | Katase | .................... | G01F 1/696 |
| 2022/0018696 A1* | 1/2022 | Katase | ..................... | G01P 5/12 |

FOREIGN PATENT DOCUMENTS

| | | | |
|---|---|---|---|
| JP | H04-38425 A | | 2/1992 |
| JP | H0545886 B2 | | 7/1993 |
| JP | H05069467 B2 | | 10/1993 |
| JP | H0835978 A | | 2/1996 |
| JP | H0953967 A | | 2/1997 |
| JP | H10-332455 A | | 12/1998 |
| JP | 2006-133243 A | | 5/2006 |
| JP | 2008-215825 A | | 9/2008 |
| JP | 2012181061 A | * | 9/2012 |
| JP | 2012189349 A | * | 10/2012 |

* cited by examiner

FLOW VELOCITY SENSOR WITH IMPROVED WEATHERABILITY

CROSS-REFERENCE TO RELATED APPLICATION

The present application is a continuation application of International Application No. PCT/JP2020/016245, filed on Apr. 13, 2020, and claims priority to Japanese Application No. 2019-078202, filed on Apr. 16, 2019, the entire disclosures of the above applications are expressly incorporated herein by reference.

BACKGROUND

1. Technical Field

The present disclosure relates to a flow velocity sensor.

2. Related Art

A flow velocity sensor detects a flow velocity of fluid by utilizing heat dissipation of a heating element. The heat dissipation of the heating element corresponds to the flow velocity of the fluid. In this kind of the flow velocity sensor, a heat generating resistor (heating element) and a temperature compensating resistor configures a resistance bridge circuit. Further, the heat generating resistor is heat-controlled so as to have a temperature that is higher than a temperature of the fluid for a predetermined degree. Thereafter, the temperature compensating resistor is used to detect the temperature of the fluid itself and compensate for the influence of the change in the fluid temperature.

As described in Japanese Patent Publication Numbers H09-53967 and H08-35978, a flow velocity sensor has been proposed in which a heat generating resistor and a temperature compensating resistor, both of which are chip resistors, are arranged close to each other on a surface of an insulating substrate.

However, with respect to the flow velocity sensors described in Japanese Patent Publication Numbers H09-53967 and H08-35978, because the heat generating resistor and the temperature compensating resistor have many opportunities for contact with the fluid, they easily deteriorate or break due to the moisture, dirt, and/or contaminant being contained in the fluid. That is, the flow velocity sensors described in the above publications are inferior in the weatherability.

SUMMARY

An object of the present disclosure is to provide a flow velocity sensor that is excellent in the weatherability.

Solution to Problem

In order to achieve the above object, according to an aspect of the present disclosure, a flow velocity sensor including: a substrate, the substrate having a first substrate surface and a second substrate surface that are outwardly opposite to each other, the first substrate surface being exposed to a fluid; a resistor mounted on the second substrate surface, the resistor having a heat generating portion, the heat generating portion facing the second substrate surface; and a signal processing section configured to receive a signal from the resister and process the signal. The signal from the resistor represents heat dissipation of the resistor. A fluid velocity is detected based on the signal from the resistor.

According to an aspect of the present disclosure, the substrate is a film-shaped substrate. A thickness of the film-shaped substrate is in a range of 0.08 mm to 1.0 mm.

According to an aspect of the present disclosure, a first area of the substrate has a hole. The heat generating portion of the resistor faces the first area.

According to an aspect of the present disclosure, the flow velocity sensor includes an insulating film. The insulating film covers a part or an entirety of each of the first and second substrate surfaces. The insulating film is configured with a resin film and/or a glass film.

According to an aspect of the present disclosure, the flow velocity sensor includes a metal film or a vapor deposition metal film that covers the insulating film.

According to an aspect of the present disclosure, the flow velocity sensor includes a cover member that covers the second substrate surface of the substrate.

The present application can provide a flow velocity sensor that is excellent in the weatherability.

DESCRIPTION OF EXEMPLARY EMBODIMENTS

Structure and Operation of Flow Velocity Sensor

As discussed below, a flow velocity sensor 1 according to an embodiment of the present application is explained with reference to the drawings.

Figure 1:
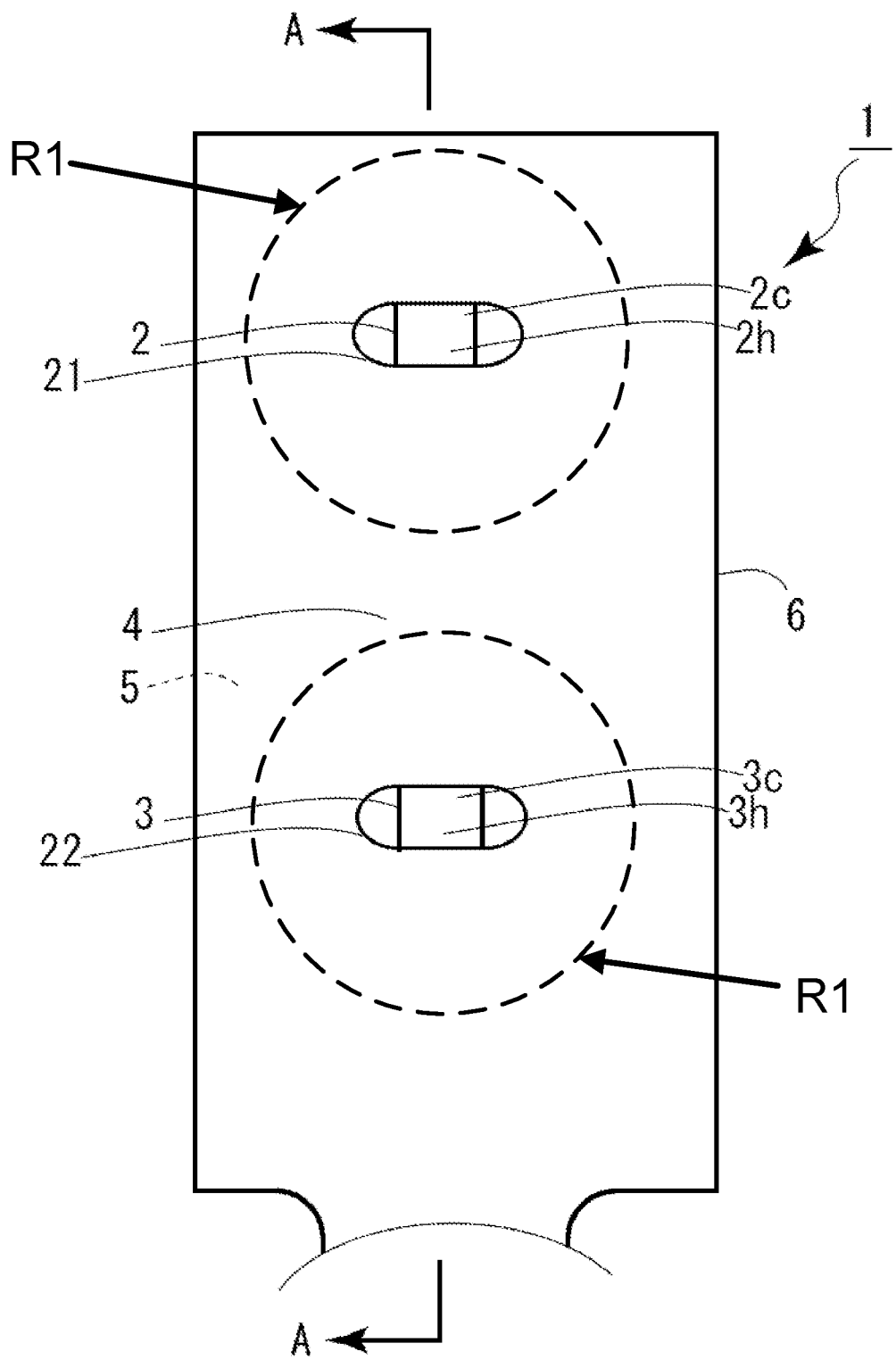
FIG. 1 is a plan view that shows a flow velocity sensor according to an embodiment of the present application.
Figure 2:
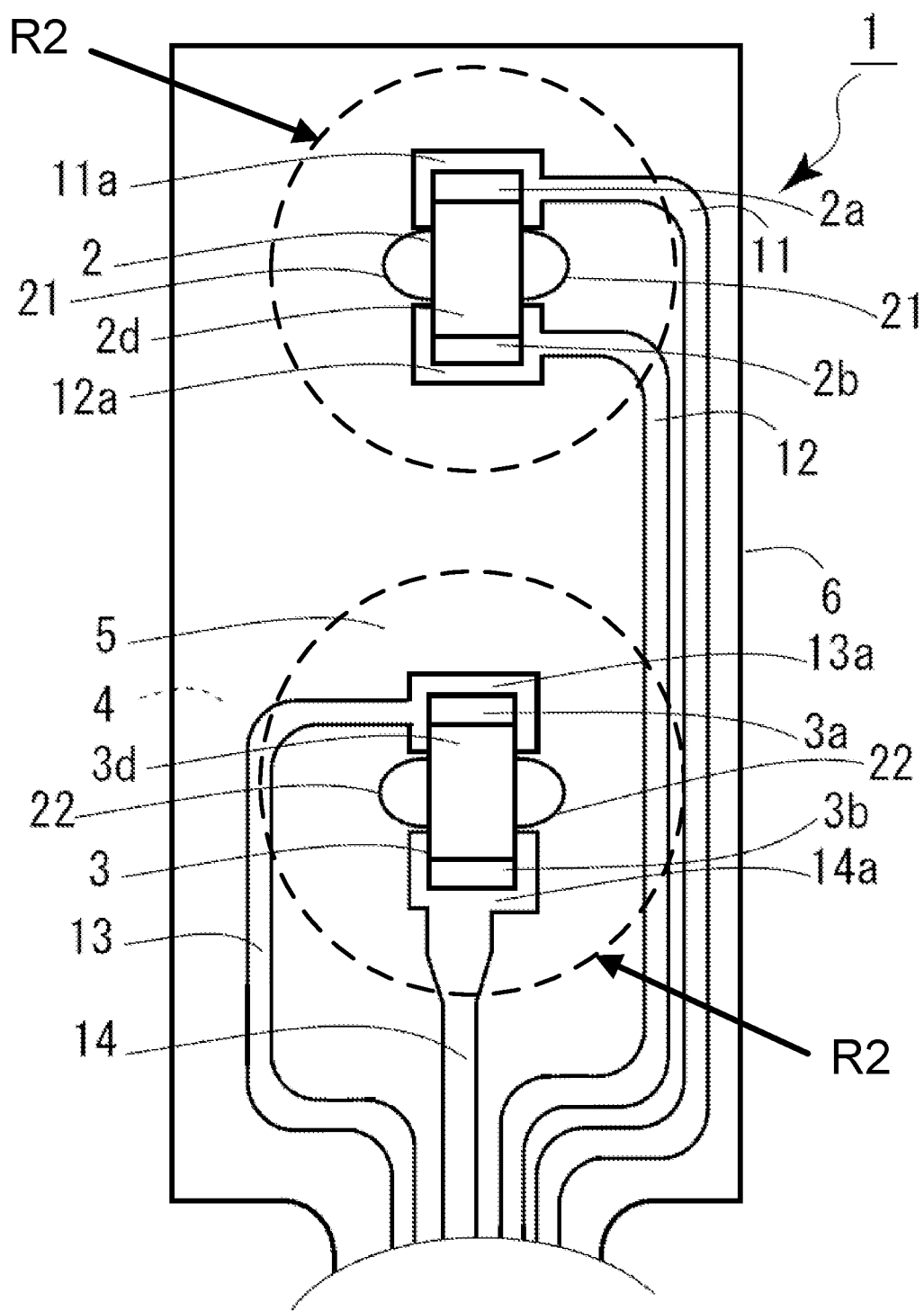
FIG. 2 is a bottom view that shows the flow velocity sensor shown in FIG. 1 according to an embodiment of the present application.
Figure 3:
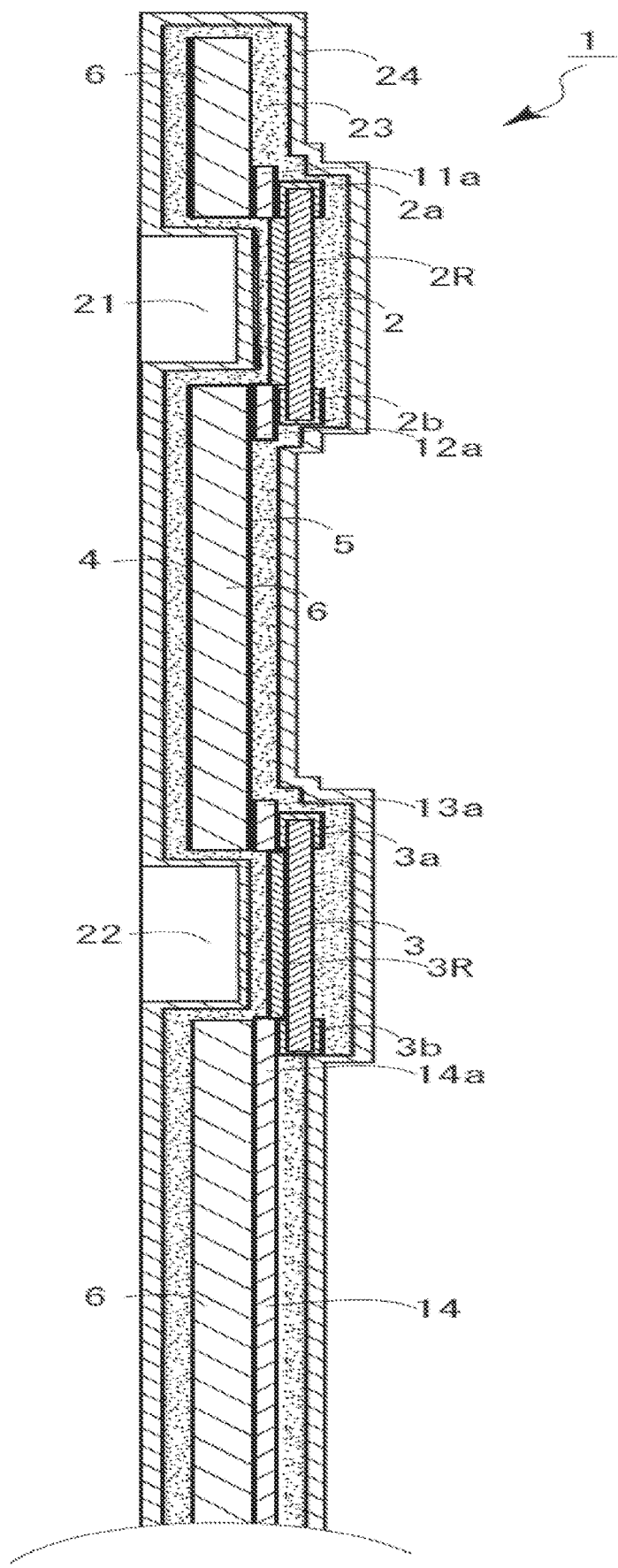
FIG. 3 is a schematic cross-sectional view of the flow velocity sensor along the A-A line shown in FIG. 1.

The flow velocity sensor 1 has a signal processing section (see FIG. 4) that processes signals from resistors 2 and 3 as shown in FIGS. 1-3. The flow velocity sensor 1 detects a flow velocity of fluid by utilizing heat dissipation of the resistor 2. Further, the flow velocity sensor 1 has a substrate 6 that is substantially rectangular-shaped. It is preferred that the size of the rectangular-shaped substrate is about 20 mm (shorter side)×a range of 20 mm-40 mm (longer side) and a thickness of the substrate 6 is about 0.1 mm. The substrate 6 has a first substrate surface 4 on the side being exposed to the fluid and a second substrate surface 5 that is outwardly opposite to the first substrate surface 4. The resistors 2 and 3 are mounted on the second substrate surface 5. Heat generating portions 2h and 3h of the resistors 2 and 3 are arranged to face and align holes (apertures, openings, or through-holes) 21 and 22 of the second substrate surface 5. The holes 21 and 22 will be described later. The holes 21 and 22 are formed for the purpose of heat dissipation, are not intended for the purpose of flow channels of the fluid.

Further, as shown in FIGS. 2 and 3, wirings 11, 12, 13, and 14 are formed on the second substrate surface 5. Each of the wirings 11, 12, 13, and 14 is made of copper. Lands 11a, 12a, 13a, and 14a are formed at the ends of the wirings 11, 12, 13, and 14, respectively. The lands 11a, 12a, 13a, and 14a are respectively connected to terminal electrodes 2a, 2b, 3a, and 3b of the resistors 2 and 3. That is, the terminal electrode 2a is connected to the land 11a. The terminal electrode 2b is connected to the land 12a. The terminal electrode 3a is connected to the land 13a. The terminal electrode 3b is connected to the land 14a. These connections are made by the soldering. However, instead, a conductive adhesive or an anisotropic conductive film (ACF) may be used for these connections. The anisotropic conductive film can realize an electrical conduction, an insulation, and a heat transfer at the same time.

Further, the resistor 2 is a heat generating resistor. The heat generating resistor 2 is heat-controlled so as to have a temperature that is higher than a temperature of the fluid for a predetermined constant degree. The temperature rise of the resistor 2 is determined based on the power consumption of the resistor 2 and the ability or easiness of the heat dissipation from the resistor 2 to the fluid and the substrate 6, i.e., a thermal conductance. Further, the resistor 3 is a temperature compensating resistor. The temperature compensating resistor 3 is used to detect a temperature of the fluid itself and compensate for the influence of the change in the fluid temperature.

As shown in FIGS. 1 and 2, the resistors 2 and 3 have resistance film arrangement surfaces 2c and 3c. The resistance film arrangement surfaces 2c and 3c face or align the second substrate surface 5 of the substrate 6. The resistors 2 and 3 also have resistance film non-arrangement surfaces 2d and 3d that are outwardly opposite to the resistance film arrangement surfaces 2c and 3c. As shown in FIG. 3, resistance films 2R and 3R are provided on the resistance film arrangement surfaces 2c and 3c of the resistors 2 and 3, respectively. The resistance films 2R and 3R generate heat when being energized (carrying current). Thus, the resistance films 2R and 3R are the same as the above-mentioned "heat generating portions 2h and 3h" (see FIG. 1). A protective coating (not shown) is applied to the upper surfaces of the resistance films 2R and 3R, i.e., the surfaces directly facing the second substrate surface 5. The protective coating is a part of the resistors 2 and 3. With respect to the resistors 2 and 3, the lands 11a, 12a, 13a, and 14a and the terminal electrodes 2a, 2b, 3a, and 3b of the resistors 2 and 3 are connected so as to face or align the second substrate surface 5. Therefore, the resistors 2 and 3 are mounted on the second substrate surface 5 of the substrate via a so-called "face down" mounting.

Heat from the lands 11a, 12a, 13a, and 14a, and the heat generating portions 2h and 3h is conducted toward areas R1 and R2 shown in FIGS. 1 and 2. Each diameter of the areas R1 and R2 is about 7 mm. The areas R1 on the first substrate surface 4 function to detect the flow velocity of the fluid. The areas R1 and R2 are explained in detail below with respect to another embodiment with reference to FIGS. 5 and 6.

Further, the substrate 6 is a thin plate substrate having a thickness of 0.1 mm. A material of the substrate 6 is made of a resin. However, the substrate 6 may be made of a ceramic. Further, with respect to the substrate 6, a material that is used for a printed wiring board, such as an epoxy resin that is mixed with glass fibers, can also be used. Thus, the substrate 6 can be an insulating substrate. It is preferred that the substrate 6 is a printed circuit board (PCB), a flexible printed circuit board (FPC), or a flexible wiring board. The wirings 11, 12, 13, and 14 are formed on the board. The lands 11a, 12a, 13a, and 14a are also formed on the board. If the substrate 6 is a FPC, a minimum thickness of the FPC is about 0.08 mm.

Further, the substrate 6 has the holes (apertures, opening, or through-holes) 21 and 22 at the positions that face or align the regions of the heat generating portions 2h and 3h of the resistors 2 and 3, respectively. As shown in FIGS. 1 and 2, the holes 21 and 22 have the same shape. Each of the holes 21 and 22 is in an oval or elliptical shape that extends along a direction orthogonal to an energizing direction (current flowing direction) of the resistors 2 and 3. Thus, as shown in FIGS. 1 and 2, the center parts of the holes 21 and 22 are only covered by the resistors 2 and 3, respectively. With respect to the size of the holes 21 and 22, it is preferred that the shorter side is about 1.0 mm and the longer side is about 2.0 mm to 2.2 mm when the size of each of the resistors 2 and 3 is 2.0 mm (longer sides)×1.25 mm (shorter sides) and a width of each of the resistance films 2R and 3R is about 1 mm. Thus, it is preferred that a length (shorter side along the energizing direction of each of the resistors 2 and 3) of each of the holes 21 and 22 is close to the width of each of the resistance films 2R and 3R to reduce the directivity of the flow velocity sensor 1.

Further, though being not clearly shown in FIGS. 1 and 2, as shown in FIG. 3, the flow velocity sensor 1 has a resin film 23 that is made of a polypropylene resin. The resin film 23 covers or coats an entirety of the first substrate surface 4, the resistors 2 and 3, and an entirely of the second substrate surface 5. Further, a metal foil (or film) 24 that is made of stainless steel is arranged over (or on) an entirety of the resin film 23. The resin film 23 and the metal foil 24 enter into the holes 21 and 22 of the substrate 6 from the side of the first substrate surface 4. The metal foil (film) 24 is formed by a vapor deposition method. Thus, the metal foil (film) 24 is a vapor deposition metal foil (film).

Figure 4:
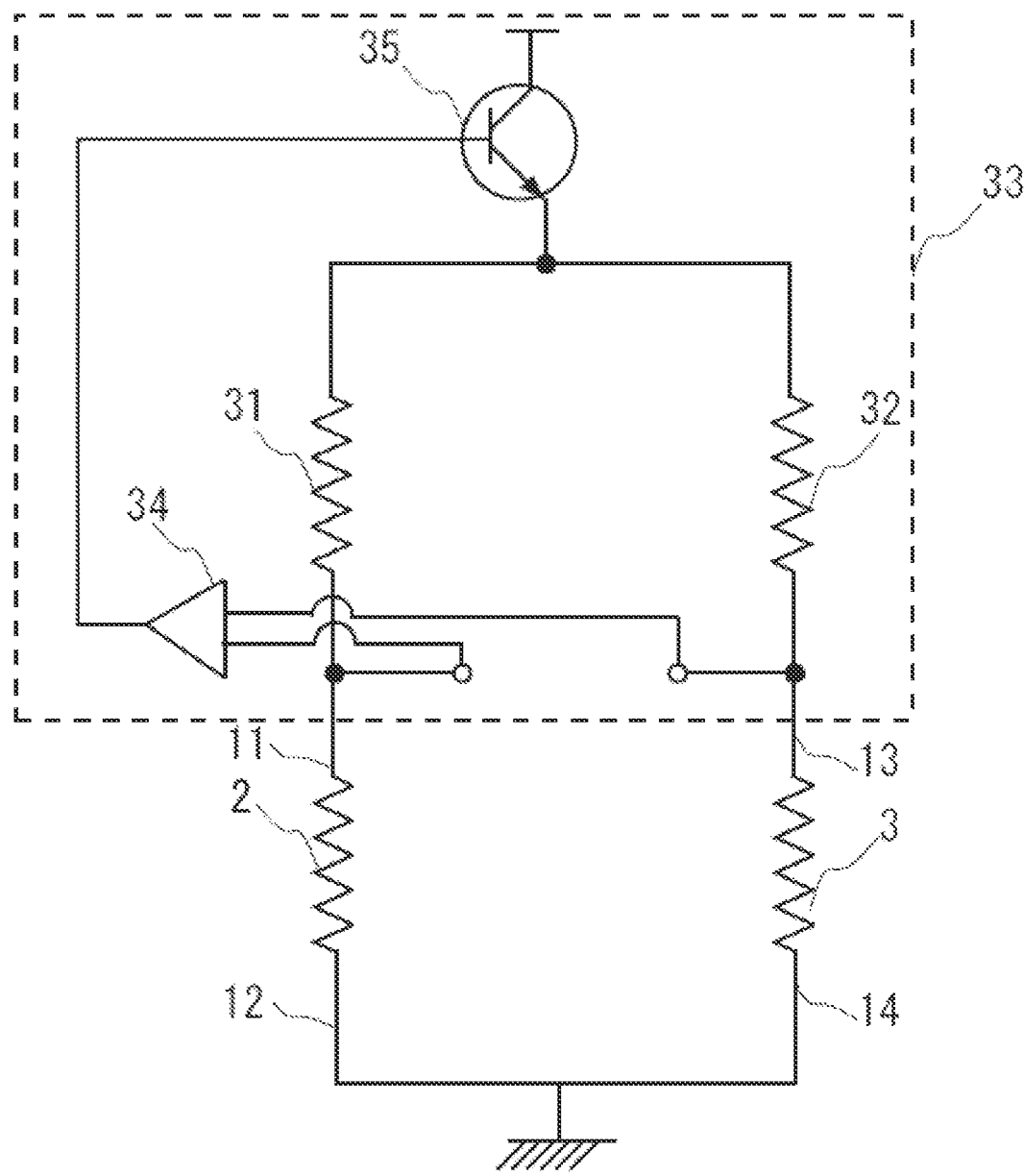
FIG. 4 is a schematic circuit diagram that shows a circuit of the flow velocity sensor according to an embodiment of the present application.

As shown in FIG. 4, the resistor 2 for the heat generation and the resistor 3 for the temperature compensation of the flow velocity sensor 1 along with chip resistors (chip-type resistors) 31 and 32 configure a voltage division circuit (bridge circuit). A signal processing section 33 has several elements, such as the resistors 31 and 32, an operational amplifier 34, and a transistor 35. Other components of the signal processing section 33 are not shown in FIG. 4. Note that a temperature coefficient of resistance (TCR) of each of the resistor 2 for the heat generation and the resistor 3 for the temperature compensation is larger than the temperature coefficient of resistance (TCR) of each of the resistors 31 and 32.

When the wind (air) is sent by fanning with a fan toward the first substrate surface 4 of the insulating substrate 6 of the flow velocity sensor 1, a temperature of the resistor 2 for the heat generation drops. The signal processing section 33 applies a drive voltage to a bridge circuit shown in FIG. 4 to maintain a temperature difference between the resistor 2 for the heat generation and the resistor 3 for the temperature compensation as always constant. The flow velocity sensor 1 outputs a flow velocity (such as a wind (air) speed or a wind (air) velocity) of a fluid by converting and utilizing the change in the drive voltages that are required to keep the temperature difference between the resistors 2 and 3 constant (the change in the drive voltages for the heating by applying the drive signal). The flow velocity (such as a wind speed or a wind velocity) that is output from the flow velocity sensor 1 is displayed. Specifically, the intensity of the flow velocity is expressed by, for example, a level or degree of a light quantity and/or emission color of a light emitting diode (LED). For example, if the flow velocity is faster or stronger (higher), the light quantity of the LED is expressed as a large (bright) level or degree. Similarly, if the flow velocity is slower or weaker (lower), the light quantity of the LED is expressed as a small (dark) level or degree. Alternately, the flow velocity is displayed as a specific numerical value.

A relationship between a flow direction of the fluid and arrangements of the resistors 2 (for the heat generation) and 3 (for the temperature compensation) on the second substrate surface 5 is explained. When the resistor 2 is positioned at an upstream side of the flow direction and the resistor 3 is positioned at a downstream side of the flow direction, a temperature of the resistor 3 becomes higher than an environmental temperature (due to the heat dissipation of the resistor 2) so that a temperature drop of the resistor 2 due to the flowing of the fluid is relatively large. As a result, there is a sensing error in which the flow velocity becomes larger than the actual flow velocity. Because of the directivity between the flowing direction of the fluid and the arrangement of the resistors 2 and 3, that error occurs. Therefore, when the flow velocity sensor 1 is used for a specific flow direction of the fluid, it is preferred that the resistor 3 is positioned at the upstream side and the resistor 2 is positioned at the downstream side. Further, when the flow velocity sensor 1 is used for detecting the air velocity of, for example, a convection air in a room, the resistor 2 is positioned closer to the ceiling of the room (upper side) and the resistor 3 is positioned closer to the floor of the room (lower side). This arrangement of the resistors 2 and 3 in the room is important because the air flow due to the heat dissipation of the resistor 2 (for the heat generation) is directed toward the ceiling. Thus, the resistor 3 (for the temperature compensation) is not affected by the heat dissipation of the resistor 2. In addition, the flow velocity sensor 1 can accurately detect the air velocity in a horizontal direction in the room without affecting by the heat dissipation of the resistor 2.

Figure 5:
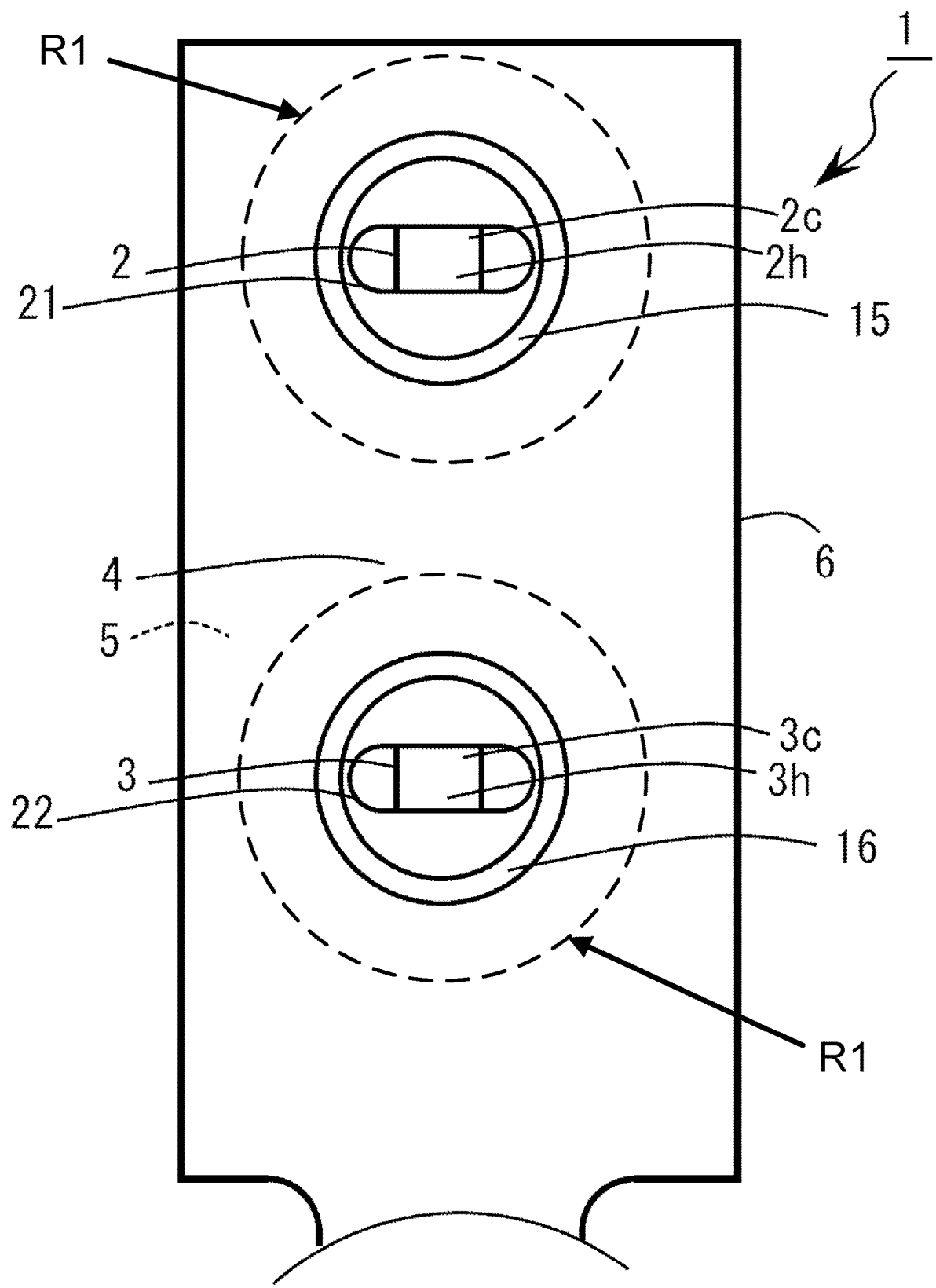
FIG. 5 is a plan view that shows a flow velocity sensor according to another embodiment of the present application.
Figure 6:
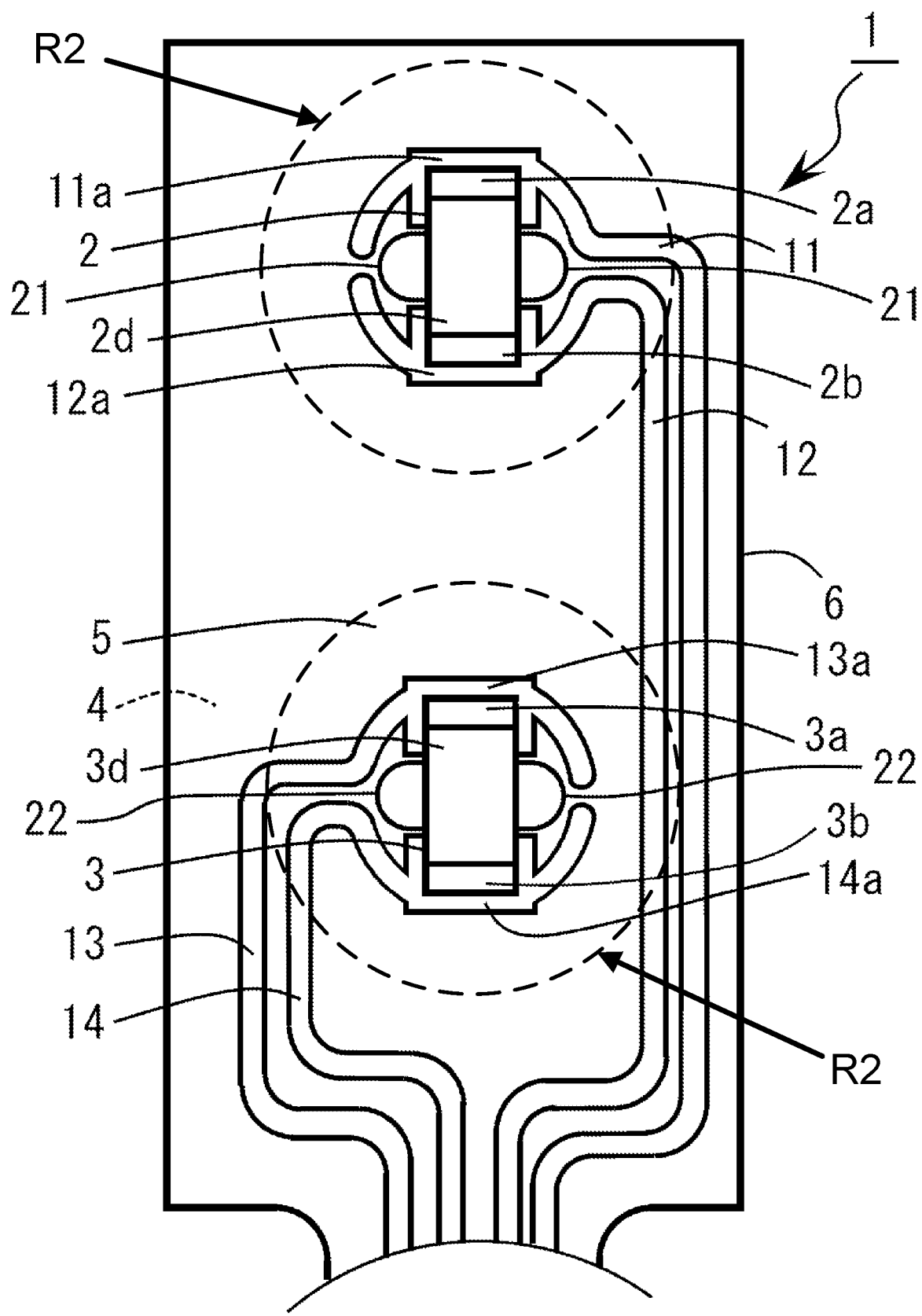
FIG. 6 is a bottom view that shows the flow velocity sensor shown in FIG. 5 according to another embodiment of the present application.

The flow velocity sensor 1 according to another embodiment is explained with reference to FIGS. 5 and 6. The differences between the illustrations shown in FIGS. 1 and 2 and the illustrations shown in FIGS. 5 and 6 are heat leveling (or dissipation) (conductor) patterns 15 and 16 on the first substrate surface 4, and arc-shaped (semicircular-shaped) arrangements of the wirings 11, 12, 13, and 14 on the second substrate surface 5. Therefore, with respect to the flow velocity sensor 1 shown in FIGS. 5 and 6, the redundant explanations with respect to the substantially same configurations as the flow velocity sensor 1 shown in FIGS. 1 and 2 are omitted, but the same reference numerals are used for labeling.

Each of the heat leveling patterns 15 and 16 is made of copper and can be the same shape and size. Only one set of the heat leveling patterns 15 and 16 or the arc-shaped arrangements of the wirings 11, 12, 13, and 14 may be provided. However, it is preferred that the heat leveling patterns 15 and 16, and the arc-shaped arrangements of the wirings 11, 12, 13, and 14 are provided. The heat leveling patterns 15 and 16 are formed on the first substrate surface 4 as shown in FIG. 5. The arc-shaped arrangements of the wirings 11, 12, 13, and 14 are formed on the second substrate surface 5 as shown in FIG. 6. Specifically, parts of the wirings 11, 12, 13, and 14 that are located around the resistors 2 and 3, and the holes 21 and 22 are arc-shaped or semicircular-shaped as shown in FIG. 6. The heat leveling patterns 15 and 16, and the arc-shaped parts of the wirings 11, 12, 13, and 14 are positioned at the corresponding locations via the substrate 6. Thus, the heat leveling patterns 15 and 16 can align (can be overlapped) with the arc-shaped parts of the wirings 11, 12, 13, and 14, and the lands 11*a*, 12*a*, 13*a*, and 14*a* via an insulating layer and/or the insulating substrate 6.

As shown in FIGS. 5 and 6, the heat leveling patterns 15 and 16, and the arc-shaped parts of the wirings 11, 12, 13, and 14 (and the lands 11*a*, 12*a*, 13*a*, and 14*a*) surround the holes 21 and 22. Further, the heat leveling patterns 15 and 16 are insulated from the wirings 11, 12, 13, and 14, and the lands 11*a*, 12*a*, 13*a*, and 14*a* via the insulating layer in the substrate 6 and/or the insulating substrate 6. The heat leveling patterns 15 and 16, and the arc-shaped parts of the wirings 11, 12, 13, and 14 (and the lands 11*a*, 12*a*, 13*a*, and 14*a*) function to dissipate heat, especially, from the lands 11*a*, 12*a*, 13*a*, and 14*a*, and the heat generating portions 2*h* and 3*h*, and to decrease heat conductance in areas R1 and R2. Such heat is conducted toward the areas R1 and R2. It is confirmed that the temperature of the areas R1 and R2 is increased when the flow velocity sensor 1 operates by the experiments conducted by the inventor. Each diameter of the areas R1 and R2 is about 7 mm. Each diameter of the heat leveling patterns 15 and 16, and the arc-shaped parts of the wirings 11, 12, 13, and 14 (and the lands 11*a*, 12*a*, 13*a*, and 14*a*) is about 3 mm. The pattern width and pattern thickness of each of the heat leveling patterns 15 and 16, and the arc-shaped parts of the wirings 11, 12, 13, and 14 are 0.2 mm to 0.3 mm (width) and 35 µm (thickness).

Therefore, the heat leveling patterns 15 and 16, and the arc-shaped parts of the wirings 11, 12, 13, and 14 control the heat distribution in the areas R1 and R2 by forming them in circular shapes. As a result, the heat leveling patterns 15 and 16, the arc-shaped parts of the wirings 11, 12, 13, and 14 can improve (reduce) the directivity of the heat dissipation in the areas R1 and R2. In addition, because the heat is uniformly dissipated from the areas R1, the areas R1 on the first substrate surface 4 function to accurately detect the flow velocity of the fluid based on temperature differences.

The temperature increase of the areas R2 on the second substrate surface 5 is considered as a source of the (detection) signals of the flow velocity from the resistors 2 and 3. The increased temperature (heat) of the areas R2 is conducted to the corresponding areas R1. Thus, a temperature drop from the increased temperature in the areas R1 (such dropped temperature (heat) is again conducted to the corresponding areas R2) corresponds to the detection signal of the flow velocity. As mentioned above, the areas R1 and the areas R2 are outwardly opposite to each other via the substrate 6 as shown in FIGS. 1, 2, 5, and 6. Further, the size (each having the diameter of about 7 mm) of each of the areas R1 and R2 is defined based on the size and dimension of the flow velocity sensor 1 (heat conductance property). For example, the substrate (PCB or FPC) 6 has a shorter side of 20 mm, a longer side (range) of 20 mm to 40 mm, and the thickness of 0.1 mm. The size of each of the resistors 2 and 3 is set to be 2.0 mm (longer sides)×1.25 mm (shorter sides)×0.45 mm (thickness). Each of the (copper) wirings 11, 12, 13, and 14 has a line width of 0.2 mm to 0.3 mm and a thickness of 35 µm. The size of each of the holes 21 and 22 is set to be 2.2 mm (longer length)×1.0 mm (shorter length). The diameter, pattern width, and pattern thickness of each of the heat leveling patterns 15 and 16, and the arc-shaped parts of the wirings 11, 12, 13, and 14 are 3 mm, 0.2 mm to 0.3 mm, and 35 µm, respectively.

As described above, in the flow velocity sensor 1 according to the embodiment of the present application, the heat generating portions 2h and 3h of the resistors 2 and 3 are arranged so as to face the second substrate surface 5 that is not exposed to the fluid. Therefore, because the resistors 2 and 3 are hidden from the fluid by the substrate 6, it is possible to provide the flow velocity sensor 1 that is excellent in the weatherability. Further, even if the flow velocity sensor 1 has a configuration in which the holes 21 and 22 of the substrate 6 are blocked or closed, the function of the flow velocity sensor 1 is maintained by the heat dissipation from the terminal electrodes 2a, 2b, 3a, and 3b of the resistors 2 and 3 to such as the lands 11a, 12a, 13a, and 14a. However, when the holes 21 and 22 are not provided, it is preferred that the good heat conduction is ensured by providing (interposing) such as a thermally (heat) conductive adhesive, a conductive adhesive, or a thermally (heat) conductive film between the substrate 6 and the heat generating portions 2h and 3h of the resistors 2 and 3. Further, when the substrate 6 is made as a film (film-shaped) substrate or a thin plate substrate having a thickness of 0.1 mm, the heat transfer efficiency in the thickness direction of the substrate 6 becomes excellent. As a result, even if the flow velocity sensor 1 has a configuration in which the holes 21 and 22 of the substrate 6 (the film (film-shaped) substrate or the thin plate substrate having the thickness of 0.1 mm) are blocked or closed, the sensitivity of the flow velocity sensor 1 is maintained.

As mentioned above, it is preferred that the size of the rectangular-shaped substrate is about 20 mm (shorter sides)×a range of 20 mm-40 mm (longer sides) and the thickness of the substrate 6 is about 0.1 mm. The substrate is, for example, a PCB or a FPC. A pair of the resistors 2 and 3 that are formed on the substrate 6 forms one-channel flow velocity sensor 1. As an application, 50-channel flow velocity sensor can be formed on the substrate 6 of about 450 mm×225 mm in which 50 pairs of the resistors 2 and 3 are arranged in a matrix and are spaced apart from one another via about 45 mm. The size of the substrate 6 for the 50-channel flow velocity sensor may be a maximum size under a regular manufacturing process.

Further, it is possible to provide the flow velocity sensor 1 in which although parts such as the resistors 2 and 3 or the wirings 11, 12, 13, and 14 do not contact with the fluid (are in a non-contact manner with the fluid) to be measured, the flow velocity sensor 1 can be operated. Further, the flow velocity sensor 1 can be manufactured by a general printed (wiring) board (substrate) manufacturing process that is referred to as a "reflow process" without requiring a metal grinding process or a resin molding process. Thus, the "reflow process" is advanced in cost reduction because they do not require a metal grinding process or a resin molding process. Further, the flow velocity sensor 1 can be expected to develop various new applications because of the thinness of the size, an easiness of handling, and an excellent weatherability.

Further, since the fluid directly contacts the heat generating portions 2h and 3h of the resistors 2 and 3 by providing the holes 21 and 22 in the substrate 6, the sensitivity of the flow velocity sensor 1 is improved. Further, even when the holes 21 and 22 are provided in the substrate 6, the connecting parts between the lands 11a, 12a, 13a, and 14a and the terminal electrodes 2a, 2b, 3a, and 3b of the resistors 2 and 3 are still hidden from the fluid by the substrate 6. As a result, the weatherability of the flow velocity sensor 1 is ensured.

Further, because the fluid comes in contact with the resistors 2 and 3 via the holes 21 and 22, the influence due to flow direction differences of the fluid for the thermal conductance is unlikely to occur. As a result, the directivity of the flow velocity sensor 1 becomes excellent, i.e., a non-directional flow velocity sensor. Note that the main factor for causing sensitivity differences of the flow velocity sensor 1 is locational relationships between the flow direction of the fluid and long or short sides of the resistors. Specifically, the flow direction of the fluid aligns with an extending direction of the long side(s) or an extending direction of the short side(s) of the resistors 2 and 3. Accordingly, actual values of the sensitivity difference (the sensitivity deviation) with respect to the above-mentioned extending directions of the long side(s) and the short side(s) of the resistors 2 and 3 are measured. As a result, the sensitivity difference of a comparative product is −33%. The resistors 2 and 3 of the comparative product are mounted on the first substrate surface 4 of the substrate 6 on which the fluid directly flows. On the other hand, the sensitivity difference of the prototype (the flow velocity sensor 1) according to the present embodiment is −6%. As mentioned above, the resistors 2 and 3 of the prototype (the flow velocity sensor 1) according to the present embodiment are mounted on the second substrate surface 5 of the substrate 6 on which the fluid does not directly flows. The sizes of the comparative product and the prototype according to the present embodiment are the same. Specifically, the size of each of the resistors 2 and 3 is set to be 2.0 mm (long side)×1.25 mm (short side)×0.45 mm (thickness). The thickness of the substrate 6 is set to be 0.1 mm. The size of each of the holes 21 and 22 is set to be 2.2 mm×1.0 mm as described earlier. Further, the evaluations are performed by applying the wind toward the first substrate surface 4 of the substrate 6 at an elevation angle of 10 degrees from the horizontal surface with respect to the first substrate surface 4. In addition, when there are no holes 21 and 22 in the substrate 6, the influence by the sensitivity difference due to the flow directions of the fluid can be made almost zero in the prototype (the flow velocity sensor 1) according to the present embodiment. As a result, the directivity of the flow velocity sensor 1 becomes further excellent.

The flow velocity sensor 1 has the resin film 23 that covers or coats an entirety of the first substrate surface 4, the resistors 2 and 3, and an entirety of the second substrate surface 5 as shown in FIG. 3. Therefore, with respect to the flow velocity sensor 1, the weatherability against such as the moisture or humidity and the dust in the air is further improved. Further, the resin film 23 can protect electric circuit components (such as the resistors, terminal electrodes, lands, and wirings) from external factors, for example, the contact of a hand or fingers of a person and an unexpected physical impact by an object.

Further, the metal foil 24 is arranged (covers or coats) on an entirety of an outer surface area of the resin film 23 as shown in FIG. 3. As a result, with respect to the flow velocity sensor 1, the weatherability against such as the moisture or humidity and the dust in the air is further improved. Further, the flow velocity sensor 1 can protect the resin film 23 from such as a mechanical impact because the metal foil 24 is formed. In addition, it is possible to provide the flow velocity sensor 1 at a low cost because a technology such as vacuum forming (molding) of a thermoplastic film can be used. This technology is now provided at a low cost for covering or coating the resin film 23 and/or the metal foil 24.

Other Embodiments

The flow velocity sensor 1 according to the embodiment of the present application described above is an example of a preferred embodiment of the present invention. But, the flow velocity sensor 1 is not limited the above embodiment. It will be apparent that the flow velocity sensor may be varied in many ways. Such variations are not to be regarded as a departure from the spirit and scope of the invention.

For example, the holes 21 and 22 in the substrate 6 may not be provided. Even if the holes 21 and 22 in the substrate 6 are not provided, the function of the flow velocity sensor 1 is maintained by the heat dissipation from the terminal electrodes 2a, 2b, 3a, and 3b of the resistors 2 and 3 to such as the lands 11a, 12a, 13a, and 14a. However, when the holes 21 and 22 are not provided, it is preferred that the good heat conduction is ensured by providing (interposing) such as a thermally (heat) conductive adhesive, a conductive adhesive, or a thermally (heat) conductive film between the substrate 6 and the heat generating portions 2h and 3h of the resistors 2 and 3. Further, as shown in FIGS. 1 and 2, the holes 21 and 22 have the same shape. Each of the holes 21 and 22 is in an oval or elliptical shape that extends along a direction orthogonal to an energizing direction (current flowing direction) of the resistors 2 and 3. However, the shapes of the holes 21 and 22 may be different. Further, the shape of each of the holes 21 and 22 may be, for example, a circular shape (circular-shaped) or a polygon shape (polygon-shaped) instead of the oval or elliptical shape that extends along the direction orthogonal to the energizing direction (current flowing direction) of the resistors 2 and 3. In addition, when the substrate 6 is made as a film (film-shaped) substrate or a thin plate substrate having a thickness of 0.1 mm, the heat transfer efficiency in the thickness direction of the substrate 6 becomes excellent. As a result, even if the flow velocity sensor 1 has a configuration in which the holes 21 and 22 of the substrate 6 (the film (film-shaped) substrate or the thin plate substrate having the thickness of 0.1 mm) are blocked or closed, the sensitivity of the flow velocity sensor 1 is maintained.

Further, the substrate 6 is the thin plate substrate that is made of a resin and has the thickness of 0.1 mm. If the substrate 6 is a FPC, a minimum thickness of the FPC is about 0.08 mm. However, even when the thickness of the substrate 6 exceeds 0.1 mm, it is often that the function of the flow velocity sensor 1 is not significantly affected. Therefore, the thickness of the substrate 6 is not strictly limited. However, as the substrate 6, it is preferred that a film (film-shaped) substrate or a thin plate substrate, such as a PCB or a FPC as discussed earlier, having a thickness of 1.0 mm or less (a thickness is in a range of 0.08 mm to 1.0 mm) is used. The thinner the thickness of the substrate 6 is, the more likely the design property (design characteristic) of the flow velocity sensor 1 is positively affected. When an entirety of the flow velocity sensor 1 becomes thin, it tends to be a slim and cool flow velocity sensor 1. The material of the substrate 6 is made of the resin. However, another material, which is used for a printed wiring board, such as a ceramic or an epoxy resin being mixed with glass fibers can be used for the substrate 6. Further, a metal plate, such as a stainless steel plate, in which the surface is covered with an insulator can also be used.

Further, the flow velocity sensor 1 has the resin film 23 that covers or coats an entirety of the first substrate surface 4, the resistors 2 and 3, and an entirety of the second substrate surface 5 as shown in FIG. 3. However, because the resin film 23 is not an essential (required) component, it can be omitted. Further, even if the resin film 23 is provided, it does not need to be provided so as to cover or coat the entirety of the surfaces of the substrate 6 and the resistors 2 and 3. For example, the resin film 23 may cover or coat the part or the entirety of the first substrate surface 4 or the second substrate surface 5. Further, for example, the resin film 23 may be provided so as to cover or coat the part or the entirety of the first substrate surface 4 that is exposed to the fluid. In addition, the resin film 23 may be provided only at the electrical connection points such as the lands 11a, 12a, 13a, and 14a and the terminal electrodes 2a, 2b, 3a, and 3b of the resistors 2 and 3. Further, in addition to that, the resin film 23 may be provided so as to cover or coat the electronic components and the wirings such as the resistors 2 and 3 and the wirings 11, 12, 13, and 14. However, in order to ensure the satisfactory weatherability of the flow velocity sensor 1 against the moisture or humidity and the dust in the air and in order to reduce the thermal conductance as small as possible between the first substrate surface 4 and the resistors 2 and 3, it is preferred that the entirety of the first substrate surface 4, the resistors 2 and 3, and the entirety of the second substrate surface 5 are covered with the resin film 23 and the holes 21 and 22 are provided. Further, the material of the resin film 23 is made of the polypropylene (resin). However, other resins such as polyethylene and polyethylene terephthalate can be used.

Further, the metal foil (or film) 24 that is made of stainless steel is arranged over (or on) the entirety of an outer surface of the resin film 23. However, because the metal foil 24 is not an essential (required) component, it can be omitted. Further, even if the metal foil 24 is provided, for example, the metal foil 24 may be provided only at the electrical connection points such as the lands 11a, 12a, 13a, and 14a and the terminal electrodes 2a, 2b, 3a, and 3b of the resistors 2 and 3. Further, the material of the metal foil 24 is not limited to the stainless steel and other metal materials can be used as the metal foil 24. However, although a metal material having a high heat (thermal) conductivity such as copper, which excessively dissipates the generated heat by the resistors 2 and 3, is undesired at the locations covering the resistors 2 and 3, such metal material having the high heat (thermal) conductivity (such as copper) can be used as the metal foil 24.

Further, as shown in FIG. 4, the signal processing section 33 has, for example, the resistors (chip-type resistors) 31 and 32, the operational amplifier 34, and the transistor 35. The signal processing section 33 applies the drive voltage to the bridge circuit to maintain the temperature difference between the resistor 2 for the heat generation and the resistor 3 for the temperature compensation as always constant. This drive voltage is a function of the thermal conductance and the circuit constant that constrains the temperature rise of the resistor 2. Further, because the above thermal conductance is a function of a flow velocity, the signal processing section 33 can obtain both of the flow velocity and the thermal conductance corresponding to the flow velocity.

Further, with respect to the output flow velocity, the intensity of the flow velocity is expressed by, for example, a level or degree of the light quantity and/or the emission color of the LED. For example, a plurality of the flow velocity sensors 1 can be arranged in a matrix in which they are regularly arranged along the vertical and horizontal directions on a plane (of a base) so as to visualize a flow velocity distribution in the manner similar to a thermal image of a thermography. This flat surface of the plane (of the base) can be made of a material that is rigid and hardly deformed. However, the plane (of the base) can also be made of, for example, a sheet that is soft and can be deformed into a curved surface or a cloth-like (fabric-like) member. Further, when the plurality of the flow velocity sensors 1 are arranged in a one-dimensional linear manner, for example, the flow velocity sensors 1 can be in a ruler shape in which the wind speed can be seen. In addition, when the plurality of the flow velocity sensors 1 are arranged on a three-dimensional net-shaped support such as a playground equipment, a Jungle Gym, that is assembled in a park, the flow velocity distribution can be, for example, visualized or informatized without obstructing the flow by an opening that is sufficiently large with respect to the thickness of each member (such as a pipe or a frame) of the support. For example, with respect to the arrangement of the flow velocity sensors 1 onto the support, the dimensions of the support may be, for example, a diameter of 3.0 cm (of each member (such as a pipe or a frame)) and an interval (corresponding to the opening) of 50.0 cm. However, the dimensions are not limited to the above dimensions. Further, it is also possible that a flow velocity distribution being created by arranging the plurality of flow velocity sensors 1 and, for example, by a natural wind by chance or by fanning with a fan by a hand is obtained. Information of the obtained flow velocity distribution can control such as the scale of sound, the timbre or tone of sound, and/or the natural sound.

In addition, because the flow velocity sensor 1 displays the fluctuation of the air in the environment or the state of the wind, the light blinks in conjunction with the movement of the leaves of the planting so as to show changes such as sunlight filtering through trees. Therefore, an installation can be build. This installation gives peace of mind or the relaxing effects that cannot be provided with an expression that is previously programmed. Further, the flow velocity sensor 1 can realize such as a lighting that is produced by a flow velocity and a wind speed (velocity). As an example of the production, by using such as the projection mapping technology, the blades of a windmill themselves or an image or light being suggestive of (reminiscent of) the blades of the windmill are projected on a wall of a building. Thereafter, a rotation speed of the blades of the windmill can be changed according to a wind speed (velocity). Further, as an example of another production, the movement of a person, an object, or a living thing can be detected and reacted as a wind speed (velocity). Further, as an example of yet another production, by attaching the flow velocity sensor 1 to a surface of a moving object, the moving speed of the moving object can be indirectly expressed as a wind speed (velocity).

Further, as an example of yet another production, the color or the shape of the light, and the size of the light of the LED of the flow velocity sensor 1 are formed different from those of the actual candle(s). Thus, the danger of the flame at first glance cannot be felt. However, because characteristics of changes in the way they shine or illumine such as the fluctuations are suggestive of (reminiscent of) candles, electronic candles that can realize the high rendering property of candles can be obtained. For example, the size of the light of the LED by the flow velocity sensor 1 is set to be as small as 1.0 mm or as large as 1.0 m. In addition, for example, when the wind is weak, the color of the light of the LED by the flow velocity sensor 1 looks like a candle by blinking small with the candle color. However, only when the wind is strong, for example, the LED by the flow velocity sensor 1 with the color such as blue and red being different from the candle shines or illumines strongly and brightly. With respect to the rendering property, for example, the blinks of a plurality of light sources are performed in conjunction with the movement of the air. That is, the light sources behave as the candles that decorate a birthday cake such as disappearing in order when being blown or becoming bright again when being about to disappear. Further, it is also possible that the wind speed distribution information is stored and transmitted in association with video or audio information. Thereafter, when the video or audio information is reproduced in the real world or virtual space, the wind speed distribution information, which is associated with the video or audio information, can be provided.

Further, it is possible to obtain such as an electronic wind chime (wind bell) being placed in an inside of a closed space that reacts to the wind being detected by the flow velocity sensor 1 that is placed at an outside of the closed space. Further, based on a temperature and a thermal conductance, an estimating device (the flow velocity sensor 1) that estimates the easiness of changes (a degree of changes) in a surface state such as the easiness of drying (a degree of dryness) of paint or food can be obtained.

Further, there is also a case in which it may be necessary to consider the atmosphere or elegance of the flow velocity sensor 1. In this case, an ornamental design that is not directly related to the flow velocity detecting function of the flow velocity sensor 1 may be provided at the substrate 6, the resin film 23, and/or the metal foil 24. For example, the above mentioned ornamental design includes various design elements such as a natural woodgrain pattern, a leaf-like pattern, a wallpaper-like pattern, an unevenness or an outer shape representing one or more of these patterns, or a heart mark. As a whole, these ornamental designs are considered for avoiding deterioration of the atmosphere of the place due to the presence of the flow velocity sensor 1. Alternatively, with respect to the above mentioned ornamental designs, it is considered for positively improving the atmosphere of the place by presenting the flow velocity sensor 1 in the place. With the above ornamental design, a fashionable flow velocity sensor 1 is realized.

Figure 7:
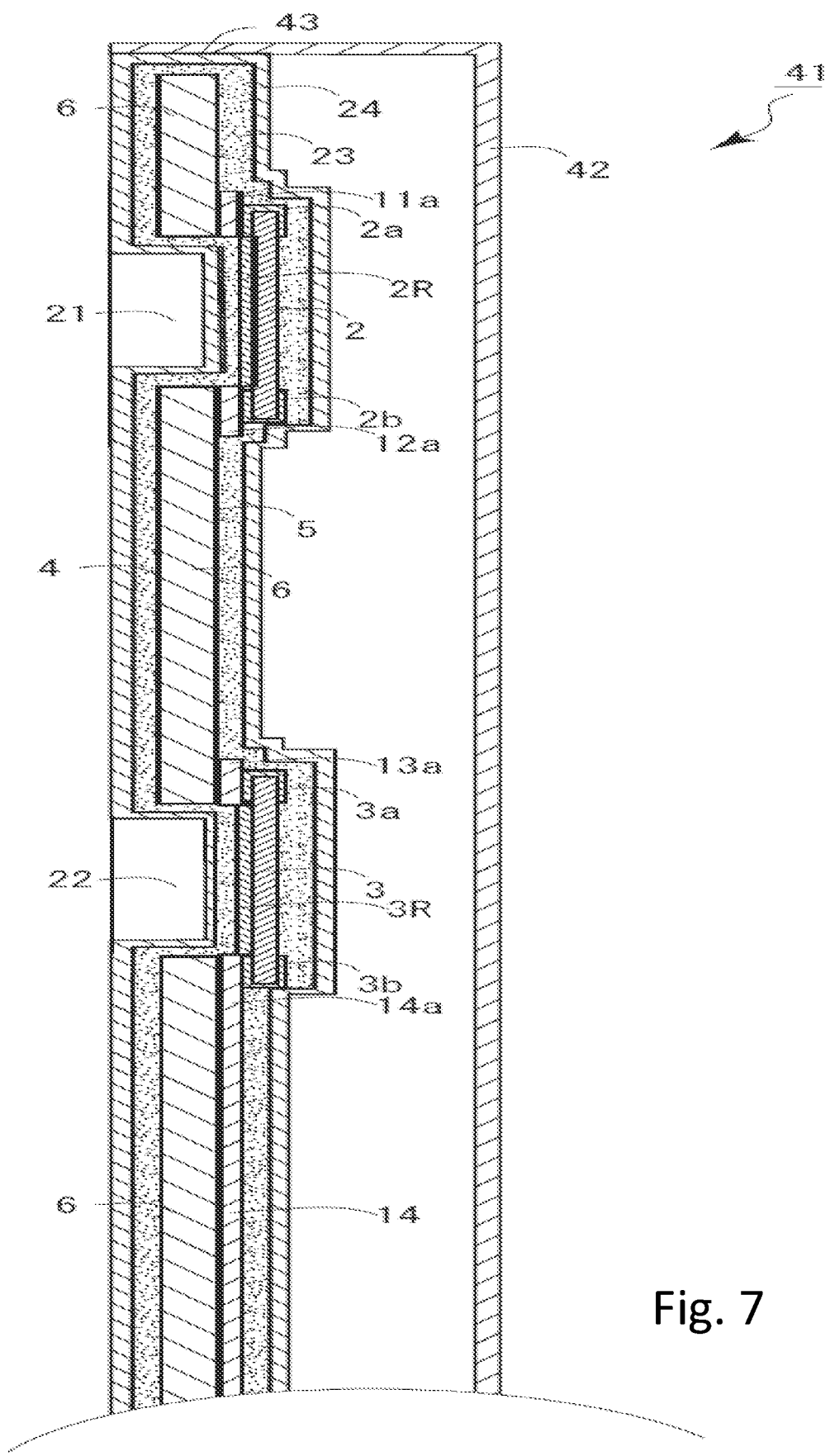
FIG. 7 is a schematic cross-sectional view that shows a variation of a flow velocity sensor according to yet another embodiment of the present application and has configurations similar to the illustration shown in FIG. 3.
Figure 8:
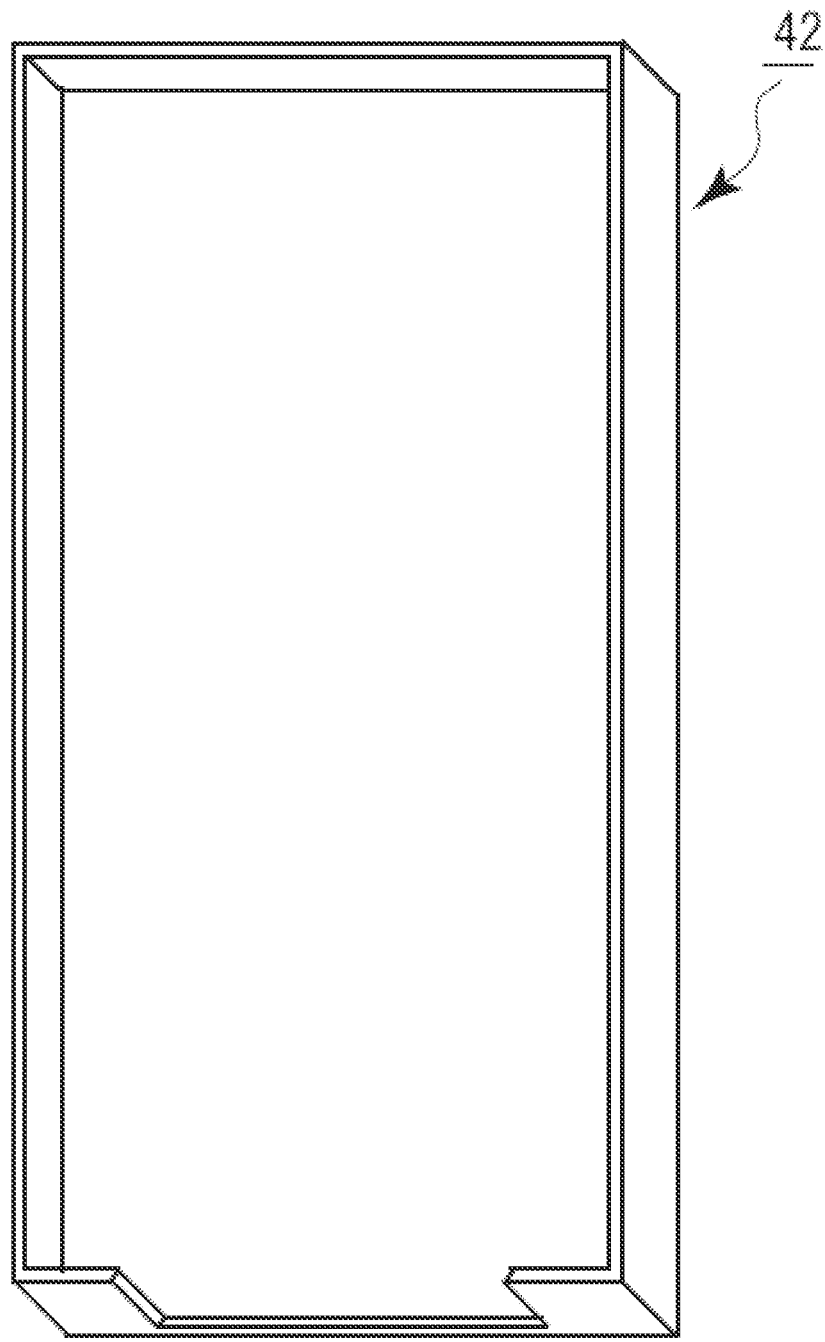
FIG. 8 is a schematic perspective view that shows a cover member that is used in the flow velocity sensor according to an embodiment of the present application.

FIG. 7 is a schematic cross-sectional view that shows a variation of the flow velocity sensor 1 shown in FIG. 3 according to the embodiment of the present application. Note that the configurations other than a cover member 42 of a flow velocity sensor 41 of the variation are the same as the flow velocity sensor 1 shown in FIGS. 1-6. Therefore, with respect to the flow velocity sensor 41, the redundant explanations with respect to the substantially same configurations as the flow velocity sensor 1 are omitted, but the same reference numerals are used for labeling. FIG. 8 is a perspective schematic view that shows a cover member 42. The flow velocity sensor 41 of the variation has the cover member 42 that is made of stainless steel and that covers the second substrate surface 5. Further, the cover member 42 has a thickness of 1.0 mm and is fixed to an end portion 43 of the quadrangular portion of the substrate 6 of the flow velocity sensor 41 via such as an adhesive.

Because the cover member 42 is fixed to the flow velocity sensor 41, the electronic components and the wirings such as the resistors 2 and 3 and the wirings 11, 12, 13, and 14 on the second substrate surface 5 are covered. As a result, the weatherability is further improved.

The cover member 42 is made of stainless steel. However, the cover member 42 may be made of other metal, a resin, or a ceramic. Further, the thickness of the cover member 42 is 1.0 mm. However, the thickness may be thicker or thinner than 1.0 mm. From the viewpoint of design, the thickness of the cover member 42 is preferred to be thinner, for example, 0.7 mm. Further, when the cover member 42 is fixed to the flow velocity sensor 41, an adhesive tape may be used without using an adhesive. Alternately, the combination of the adhesive tape and the adhesive may be used. An inner space that is surrounded (enclosed) by the cover member 42 and the substrate 6 may be filled with a heat (thermal) insulating material such as foamed plastic. As a result, the mechanical strength of the flow velocity sensor 41 is further improved. Further, with respect to the flow velocity sensor 41, it is also possible that the cover member 42 is omitted and the above mentioned heat insulating material is filled (the heat insulating material covers or coats the electronic components and the wirings such as the resistors 2 and 3 and the wirings 11, 12, 13, and 14 on the second substrate surface 5).

It is sufficient that the resin film 23 is an insulating film. For example, the insulating film may be configured by a glass film only or configured by stacked layers of a glass film and the resin film 23.

The flow velocity sensor being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A flow velocity sensor comprising:
   a substrate, the substrate having a first substrate surface and a second substrate surface that are outwardly opposite to each other, the first substrate surface being exposed to a fluid;
   a resistor mounted on the second substrate surface, the resistor having a heat generating portion, the heat generating portion facing the second substrate surface; and
   a signal processing section configured to receive a signal from the resister and process the signal,
   wherein the signal from the resistor represents heat dissipation of the resistor, and
   a fluid velocity is detected based on the signal from the resistor.

2. The flow velocity sensor according to claim 1,
   wherein the substrate is a film-shaped substrate, and a thickness of the film-shaped substrate is in a range of 0.08 mm to 1.0 mm.

3. The flow velocity sensor according to claim 1,
   wherein a first area of the substrate has a hole, and the heat generating portion of the resistor faces the first area.

4. The flow velocity sensor according to claim 2,
   wherein a first area of the substrate has a hole, and the heat generating portion of the resistor faces the first area.

5. The flow velocity sensor according to claim 1, further comprising:
   an insulating film that covers a part or an entirety of each of the first and second substrate surfaces,
   wherein the insulating film is configured with a resin film and/or a glass film.

6. The flow velocity sensor according to claim 5, further comprising:
   a metal film or a vapor deposition metal film that covers the insulating film.

7. The flow velocity sensor according to claim 2, further comprising:
   an insulating film that covers a part or an entirety of each of the first and second substrate surfaces,
   wherein the insulating film is configured with a resin film and/or a glass film.

8. The flow velocity sensor according to claim 7, further comprising:
   a metal film or a vapor deposition metal film that covers the insulating film.

9. The flow velocity sensor according to claim 3, further comprising:
   an insulating film that covers a part or an entirety of each of the first and second substrate surfaces,
   wherein the insulating film is configured with a resin film and/or a glass film.

10. The flow velocity sensor according to claim 9, further comprising:
    a metal film or a vapor deposition metal film that covers the insulating film.

11. The flow velocity sensor according to claim 4, further comprising:
    an insulating film that covers a part or an entirety of each of the first and second substrate surfaces,
    wherein the insulating film is configured with a resin film and/or a glass film.

12. The flow velocity sensor according to claim 11, further comprising:
    a metal film or a vapor deposition metal film that covers the insulating film.

13. The flow velocity sensor according to claim 1, further comprising:
    a cover member that covers the second substrate surface of the substrate.

14. The flow velocity sensor according to claim 2, further comprising:
    a cover member that covers the second substrate surface of the substrate.

15. The flow velocity sensor according to claim 3, further comprising:
    a cover member that covers the second substrate surface of the substrate.

16. The flow velocity sensor according to claim 1, further comprising:
    a heat leveling conductor pattern that is formed on the first substrate surface to surround the heat generating portion,
    wherein the heat leveling conductor pattern is configured to uniformly conduct heat from the heat dissipation of the resistor toward an inside and an outside of the heat leveling conductor pattern on the first substrate surface.

17. The flow velocity sensor according to claim 2, further comprising:
    a heat leveling conductor pattern that is formed on the first substrate surface to surround the heat generating portion,
    wherein the heat leveling conductor pattern is configured to uniformly conduct heat from the heat dissipation of the resistor toward an inside and an outside of the heat leveling conductor pattern on the first substrate surface.

18. The flow velocity sensor according to claim 3, further comprising:
    a heat leveling conductor pattern that is formed on the first substrate surface to surround the heat generating portion and the hole,
    wherein the heat leveling conductor pattern is configured to uniformly conduct heat from the heat dissipation of the resistor toward an inside and an outside of the heat leveling conductor pattern on the first substrate surface.

19. The flow velocity sensor according to claim 5, further comprising:

a heat leveling conductor pattern that is formed on the first substrate surface to surround the heat generating portion,
wherein the heat leveling conductor pattern is configured to uniformly conduct heat from the heat dissipation of the resistor toward an inside and an outside of the heat leveling conductor pattern on the first substrate surface.

20. The flow velocity sensor according to claim 13, further comprising:
a heat leveling conductor pattern that is formed on the first substrate surface to surround the heat generating portion,
wherein the heat leveling conductor pattern is configured to uniformly conduct heat from the heat dissipation of the resistor toward an inside and an outside of the heat leveling conductor pattern on the first substrate surface.

* * * * *